United States Patent
Long et al.

(10) Patent No.: US 9,783,246 B1
(45) Date of Patent: Oct. 10, 2017

(54) VEHICLE CARGO COMPARTMENT HAVING WORK SURFACE ASSEMBLY

(71) Applicants: Jeffery E Long, Canton, MI (US); Jereme A Berube, Sterling Heights, MI (US); Kyle Neighbors, Milford, MI (US)

(72) Inventors: Jeffery E Long, Canton, MI (US); Jereme A Berube, Sterling Heights, MI (US); Kyle Neighbors, Milford, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/176,348

(22) Filed: Jun. 8, 2016

(51) Int. Cl.
| | | |
|---|---|---|
| *B62D 33/027* | (2006.01) | |
| *B62D 33/02* | (2006.01) | |
| *B62D 33/033* | (2006.01) | |

(52) U.S. Cl.
CPC ....... *B62D 33/027* (2013.01); *B62D 33/0207* (2013.01); *B62D 33/033* (2013.01)

(58) Field of Classification Search
CPC B62D 33/0207; B62D 33/023; B62D 33/027; B62D 33/0273
USPC .................................................. 296/14, 37.6
See application file for complete search history.

(56) References Cited

U.S. PATENT DOCUMENTS

| | | | | |
|---|---|---|---|---|
| 5,649,734 A | * | 7/1997 | Speis | B62D 33/0273 108/44 |
| 6,467,417 B1 | * | 10/2002 | Guyot | B60P 3/14 100/152 |
| 6,905,157 B2 | * | 6/2005 | Kang | B62D 33/0273 296/55 |
| 7,182,177 B1 | | 2/2007 | Simnacher | |
| 7,464,978 B1 | | 12/2008 | Meeks | |
| 7,722,111 B2 | * | 5/2010 | Reich | B60R 9/00 296/183.1 |
| 7,819,295 B2 | * | 10/2010 | Plavetich | B60P 1/435 224/403 |
| 8,544,708 B2 | | 10/2013 | Maimin | |
| 2005/0225117 A1 | * | 10/2005 | Miskech | B60P 1/00 296/183.1 |

* cited by examiner

*Primary Examiner* — Jason S Daniels
(74) *Attorney, Agent, or Firm* — Ralph E. Smith

(57) ABSTRACT

A vehicle includes a cargo bed attached to a rear of a cab. The cargo bed includes a plurality of walls defining a periphery of the cargo bed. At least one of the plurality of walls includes a storage compartment formed therein. A work surface assembly includes a worktable and a plurality of arms attached to the worktable and pivotally attached to a wall of the storage compartment at a location inside of the storage compartment. The work surface assembly is pivotal between a stowed position in which the work surface assembly is wholly contained within the storage compartment and a deployed position in which the worktable and a portion of each arm extend out of the storage compartment.

15 Claims, 7 Drawing Sheets

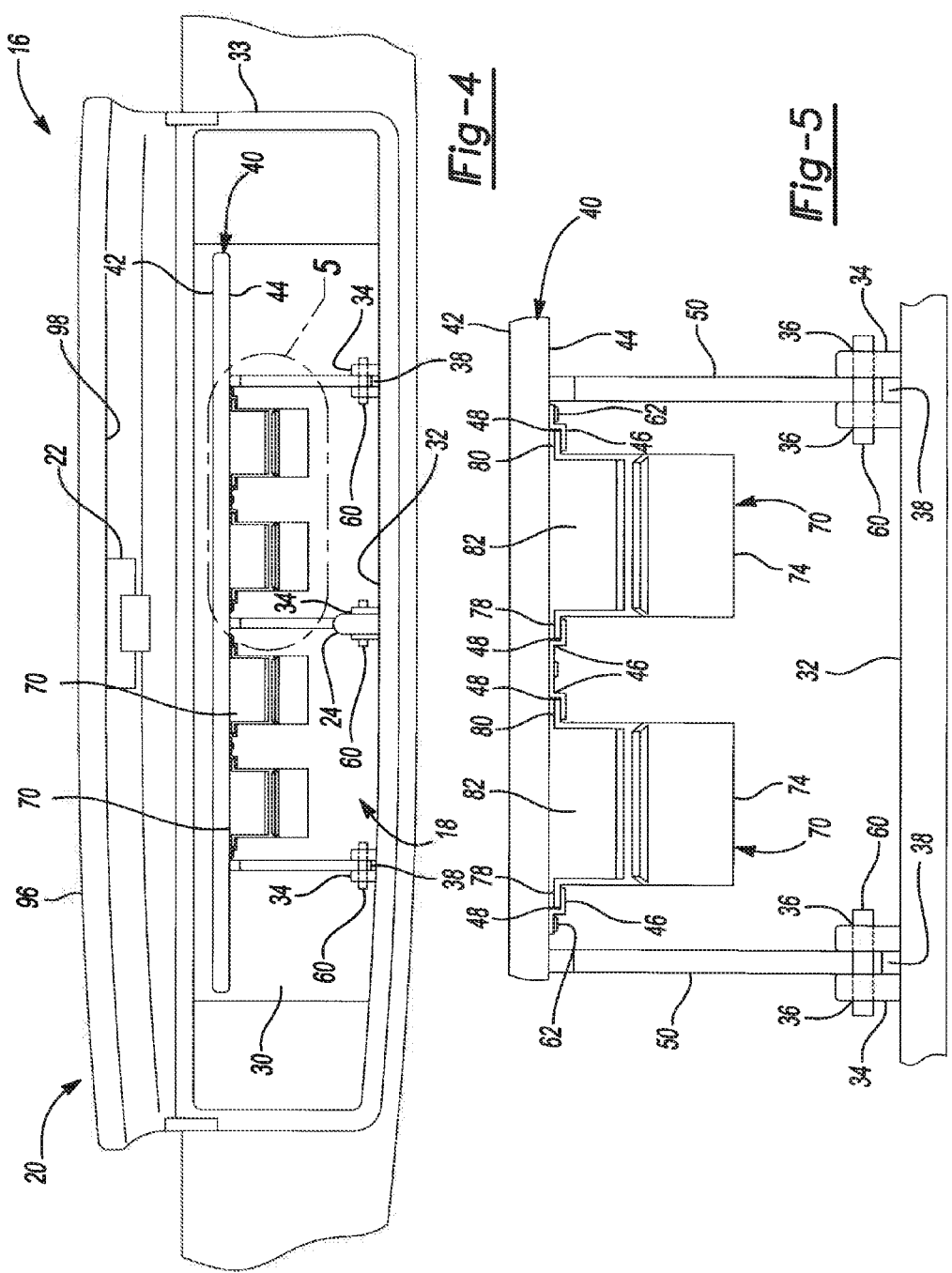

VEHICLE CARGO COMPARTMENT HAVING WORK SURFACE ASSEMBLY

FIELD

The present disclosure relates to a vehicle cargo compartment having a work surface assembly.

BACKGROUND

This section provides background information related to the present disclosure and is not necessarily prior art.

Some pickup trucks and other automotive vehicles include a cargo bed for storing and hauling cargo. Some such vehicles also include a storage compartment formed in one or more walls of the cargo bed to conveniently and securely store additional articles separate from the cargo in the cargo bed. The storage compartments are convenient for storing tools and hardware for use at a construction jobsite, for example. Many construction jobsites are not equipped with adequate work surfaces or tables. Furthermore, transporting work surfaces or tables to a construction jobsite is sometimes cumbersome and inconvenient. The present disclosure provides a vehicle with a cargo compartment having a work surface assembly that is quickly and conveniently deployable and stowable for use at a jobsite, campsite, and/or any other location.

SUMMARY

This section provides a general summary of the disclosure, and is not a comprehensive disclosure of its full scope or all of its features.

In one form, the present disclosure provides a vehicle having a cargo bed attached to a rear of a cab. The cargo bed includes a plurality of walls defining a periphery of the cargo bed. At least one of the plurality of walls includes a storage compartment formed therein. A work surface assembly includes a worktable and a plurality of arms attached to the worktable and pivotally attached to a wall of the storage compartment at a location inside of the storage compartment. The work surface assembly is pivotal between a stowed position in which the work surface assembly is wholly contained within the storage compartment and a deployed position in which the worktable and a portion of each arm extend out of the storage compartment.

In some configurations, the wall of the storage compartment includes a plurality of channels and pivot pins extending through the plurality of channels.

In some configurations, the arms are pivotally attached to the pivot pins.

In some configurations, portions of the arms that are attached to the worktable are parallel to the wall of the storage compartment when the work surface assembly is in the stowed position.

In some configurations, portions of the arms are positioned above and perpendicular to the wall of the storage compartment when the work surface assembly is in the deployed position.

In some configurations, portions of the arms are partially received in the plurality of channels of the wall when the work surface assembly is in the stowed and deployed positions.

In some configurations, the work surface assembly is rotated 90 degrees from the stowed position to the deployed position.

In some configurations, U-shaped slots extending through the plurality of arms receive the pivot pins extending through the plurality of channels to pivotally attach the plurality of arms to the wall of the storage compartment.

In some configurations, openings of the U-shaped slots face a bottom surface of the storage compartment when the work surface assembly is in the stowed position.

In some configurations, the work surface assembly is removable from the pivot pins when the openings of the U-shaped slots face the bottom surface of the storage compartment.

In some configurations, openings of the U-shaped slots face opposite the wall of the storage compartment when the work surface assembly is in the deployed position.

In some configurations, a plurality of storage containers slidably engage the worktable of the work surface assembly.

In some configurations, a back end of each storage container includes an inclined surface that is disposed at an obtuse angle relative to a bottom surface of the storage container.

In some configurations, at least a portion of the worktable extends laterally outward beyond a laterally outermost surface of the cargo bed.

In some configurations, a lid seals an opening of the storage compartment and contains the work surface assembly within the storage compartment when the work surface assembly is in the stowed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 4 is a top view of the storage compartment in an open position with the work surface assembly of FIG. 3 in the stowed position;

FIG. 5 is an close-up view of a portion of the work surface assembly indicated as area 5 in FIG. 4;

Corresponding reference numerals indicate corresponding parts throughout the several views of the drawings.

DETAILED DESCRIPTION

Example embodiments will now be described more fully with reference to the accompanying drawings.

Figure 1:
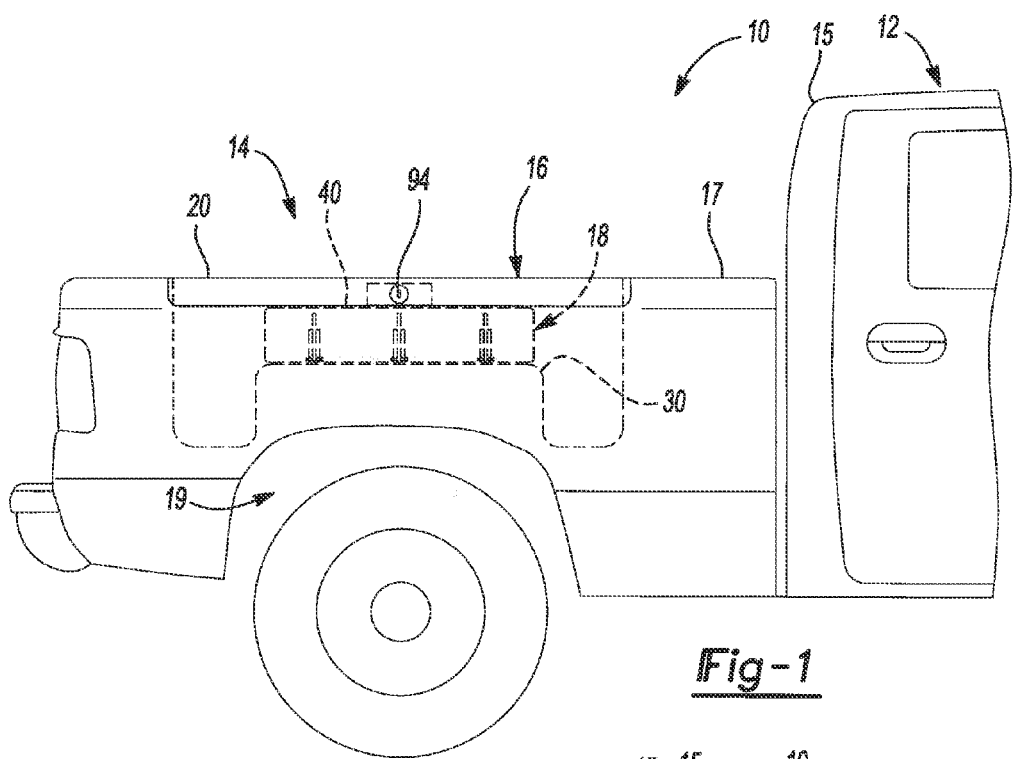
FIG. 1 is a side view of a vehicle having a cargo bed with a storage compartment according to the principles of the present disclosure.
Figure 2:
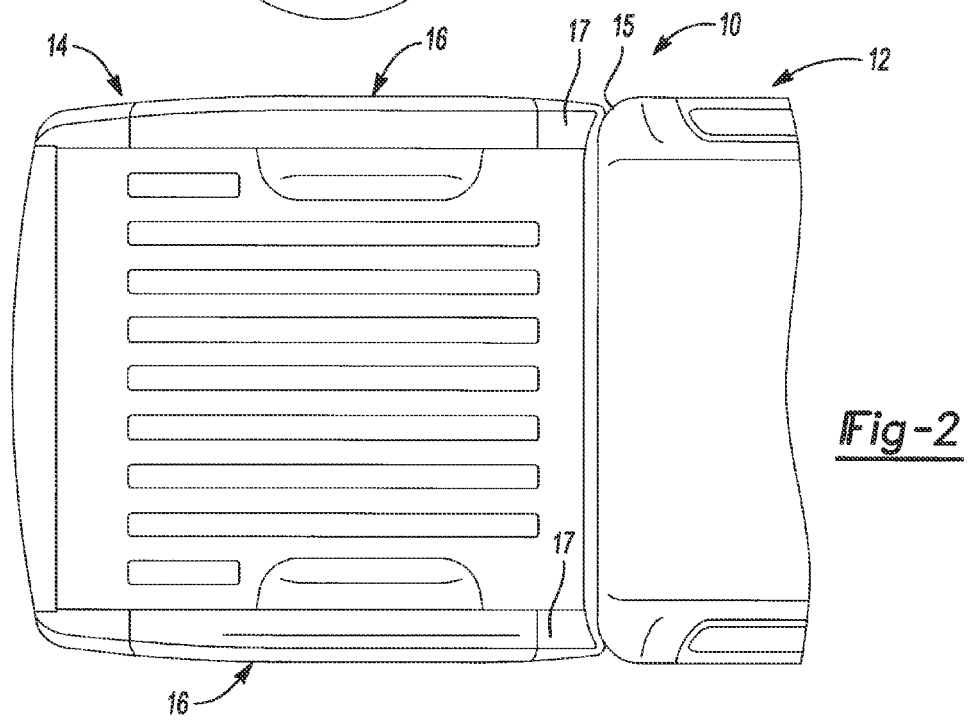
FIG. 2 is a top view of the vehicle having the cargo bed with the storage compartment of FIG. 1.

With reference to FIGS. 1 and 2, a vehicle 10 is provided that includes a cab 12 and a cargo bed 14. The cargo bed 14 is attached to an aft end 15 of the cab 12 and includes sidewalls 17 extending between fore and aft ends of the cargo bed 14. The sidewalls 17 define the lateral periphery of the cargo bed 14 and each include a storage compartment 16 therein. As will be described in more detail below, each storage compartment 16 contains a work surface assembly 18 that is movable relative to the storage compartment 16 between a stowed position (FIGS. 1 and 3-5) in which the work surface assembly 18 is wholly contained within the storage compartment 16 and a deployed or extended position (FIGS. 6-8) in which the work surface assembly 18 extends out of the storage compartment 16.

Figure 3:
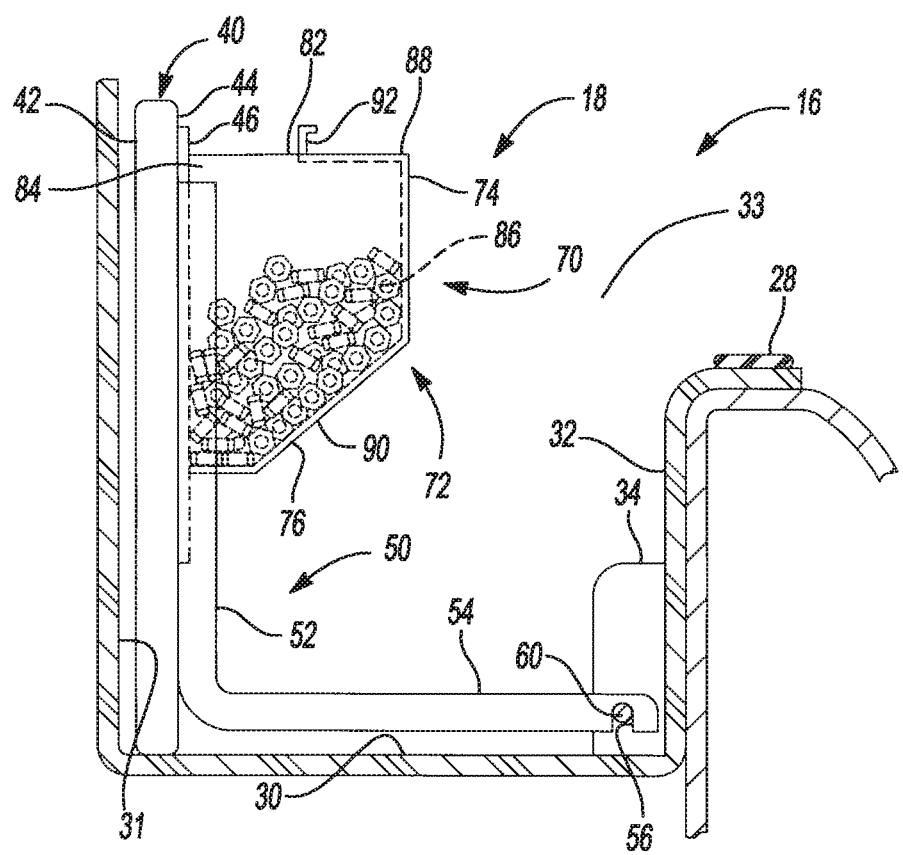
FIG. 3 is a cross-section view of a work surface assembly contained in the storage compartment of FIG. 1 in a stowed position.

As shown in FIGS. 3 and 4, each storage compartment 16 is disposed within a corresponding sidewall 17 and is defined by a bottom surface 30, an inner wall 31, and an outer wall 32. A lid 20 is pivotably connected to the sidewall 17 to selectively open and close an opening 33 of the storage compartment 16. In an example, the lid 20 is formed from a polymeric material and in another example the lid 20 is formed from a metallic material. The Lid 20 includes a lock 94 (FIG. 1) attached to an outside surface 96 and operatively connected to a latch 22 (FIG. 4) on an inside surface 98. The latch 22 engages a hook 24 (FIG. 4) attached to the outer wall 32 of the storage compartment 16 when the lid 20 is in a closed position. A rubber seal member 28 extends 360 degrees around a periphery of the opening 33 of the storage compartment 16 (FIG. 8) to seal the storage compartment 16 when the lid 20 is in the closed position, thereby preventing debris or fluids from entering the storage compartment 16. In the particular configuration shown in FIGS. 3 and 4, the bottom surface 30 is perpendicular to the inner and outer walls 31, 32. In an example, the bottom surface 30 and the walls 31, 32 are formed from a polymeric material. The bottom surface 30 is positioned above the wheel well 19 of the vehicle 10 and also supports the work surface assembly 18 when in the stowed position (FIG. 3).

Figure 6:
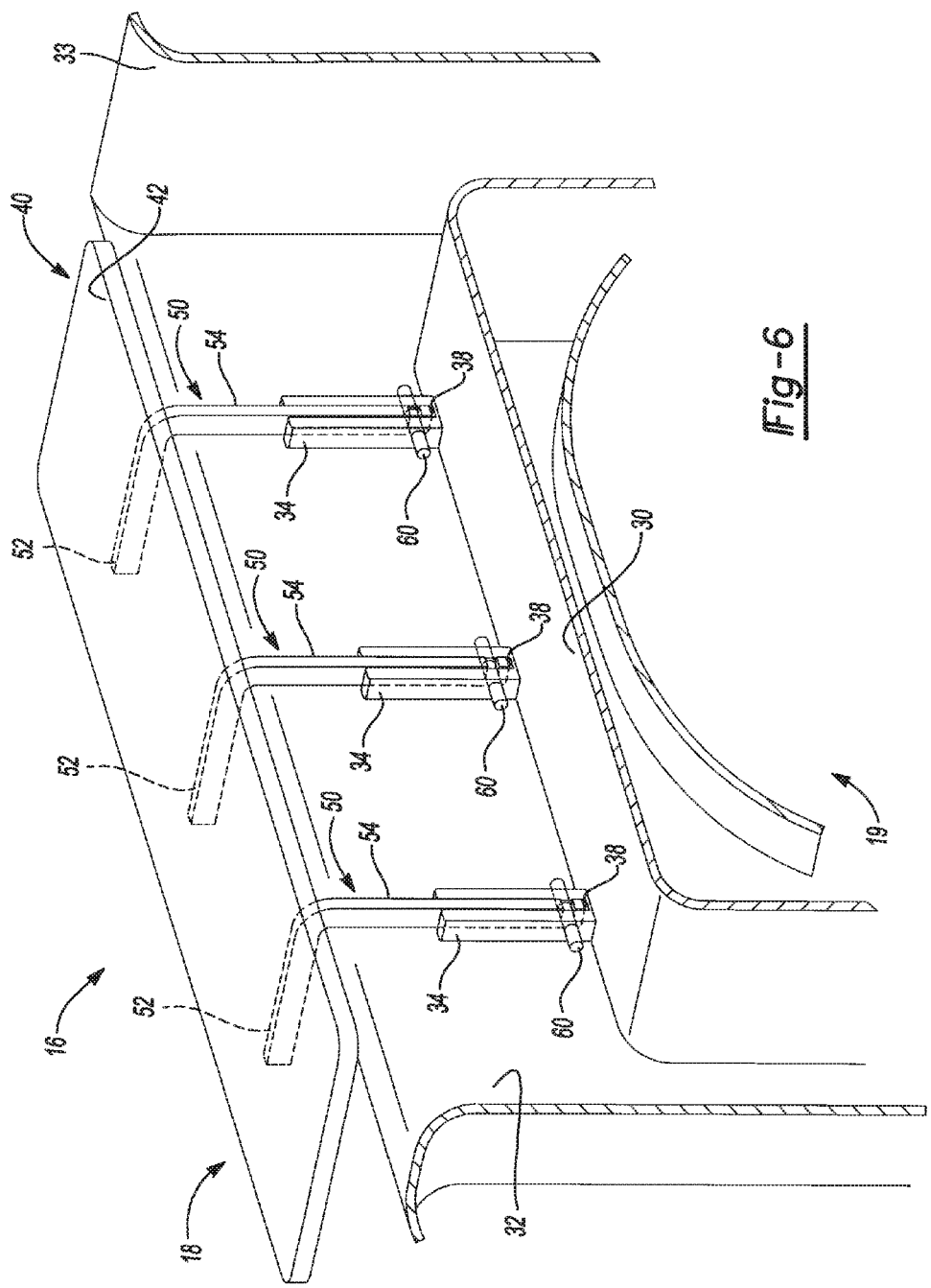
FIG. 6 is a cross-sectional perspective view of the storage compartment with the work surface assembly in an deployed position.
Figure 9:
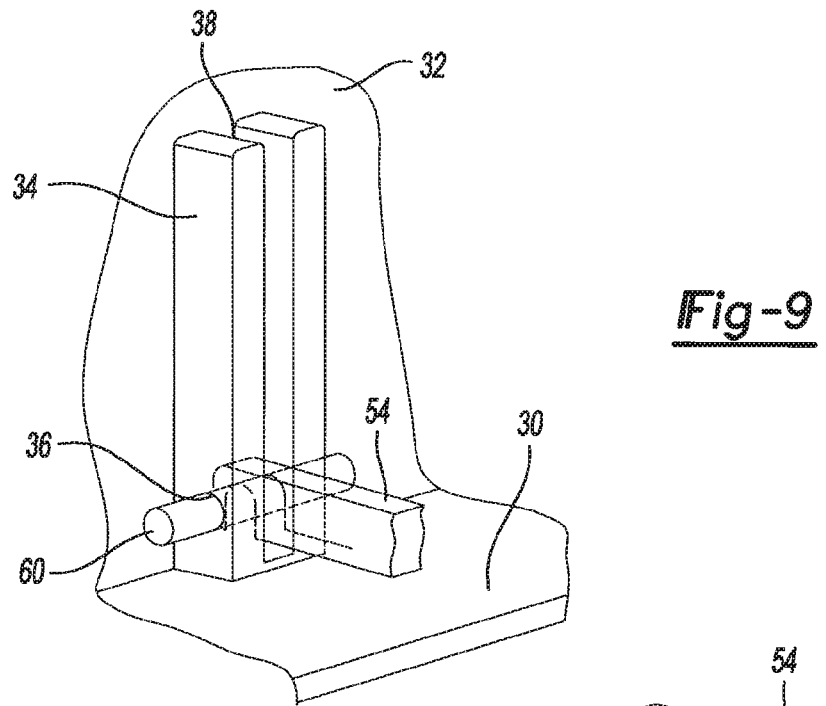
FIG. 9 is a partial perspective view of a hinge assembly of the work surface assembly in the stowed position.
Figure 10:
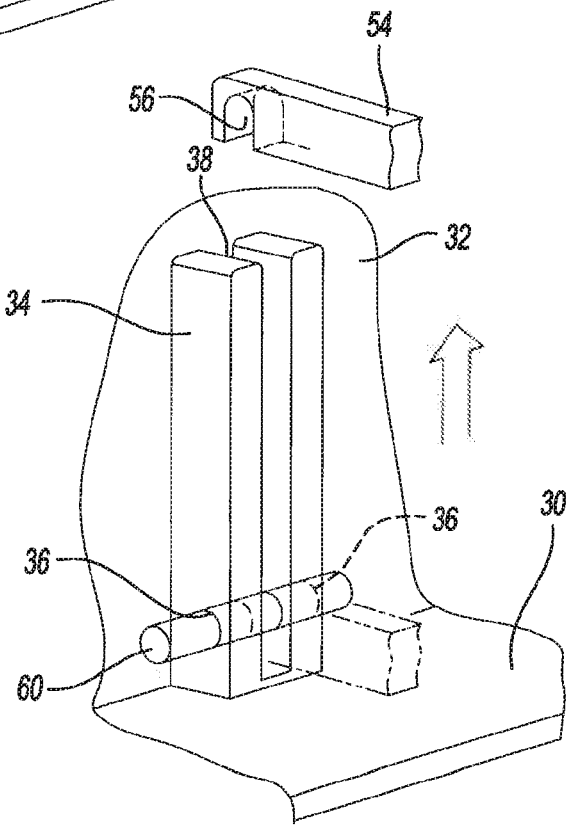
FIG. 10 is a partial perspective view of the hinge assembly with an arm of the work surface assembly removed therefrom.

As shown in FIG. 6, the outer wall 32 includes a plurality of integrally formed ribs 34 that extend upward from the bottom surface 30 and protrude into the storage compartment 16. Each rib 34 includes a channel 38 formed therein and a pair of apertures 36 (FIGS. 9 and 10) that are aligned with each other and in communication with the channel 38. As shown in FIGS. 9 and 10, each rib 34 includes a cylindrically shaped pivot pin 60 that is received in the aligned apertures and extends through the channel 38.

As shown in FIGS. 3-7, the work surface assembly 18 is pivotally attached to the outer wall 32 of the storage compartment 16. The work surface assembly 18 includes a worktable 40, a plurality of arms 50 and a plurality of storage containers 70. In the particular configuration shown in the figures, the worktable 40 is generally rectangular and is made of either wood, plastic, or a metallic material, for example. The worktable 40 is parallel to the walls 31, 32 of the storage compartment 16 when the work surface assembly 18 is in the stowed position (FIG. 3) and is positioned above and perpendicular to the walls 31, 32 of the storage compartment 16 when the work surface assembly 18 is in the deployed position (FIG. 6). The worktable 40 is also contained wholly within the storage compartment 16 when the work surface assembly 18 is in the stowed position (FIG. 3) and is disposed partially or entirely outside of the storage compartment 16 when the work surface assembly 18 is in the deployed position (FIG. 6).

The worktable 40 includes a top side 42, a bottom side 44, and a plurality of rails 46. The top side 42 is opposite from the bottom side 44, The bottom side 44 faces the outer wall 32 of the storage compartment 16 when the work surface assembly 18 is in the stowed position. As shown in FIGS. 3 and 6, the top and bottom side 42, 44 are both perpendicular to the bottom surface 30 of the storage compartment 16 when the work surface assembly 18 is in the stowed position and parallel thereto when the work surface assembly 18 is in the deployed position. As shown in FIG. 3, the plurality of rails 46 are attached to the bottom side 44 of the worktable 40 by fasteners 62 (FIG. 5) such that each rail 46 is vertically oriented on the bottom side 44 of the work table 40 when the work surface assembly 18 is in the stowed position. Slots 48 are formed between a portion of each rail 46 and the bottom side 44 of the worktable 40 (FIG. 5).

The plurality of arms 50 are generally L shaped and made out of either a metallic or plastic material, for example. The plurality of arms 50 are wholly contained within the storage compartment 16 when the work surface assembly 18 is in the stowed position (FIG. 3) and extend at least partially out of the storage compartment 16 and laterally away from the cargo bed 14 when the work surface assembly 18 is in the deployed position (FIG. 6). The plurality of arms 50 are attached at one end to the worktable 40 and are pivotally attached at another end to the ribs 34 via the pivot pins 60.

Figure 7:
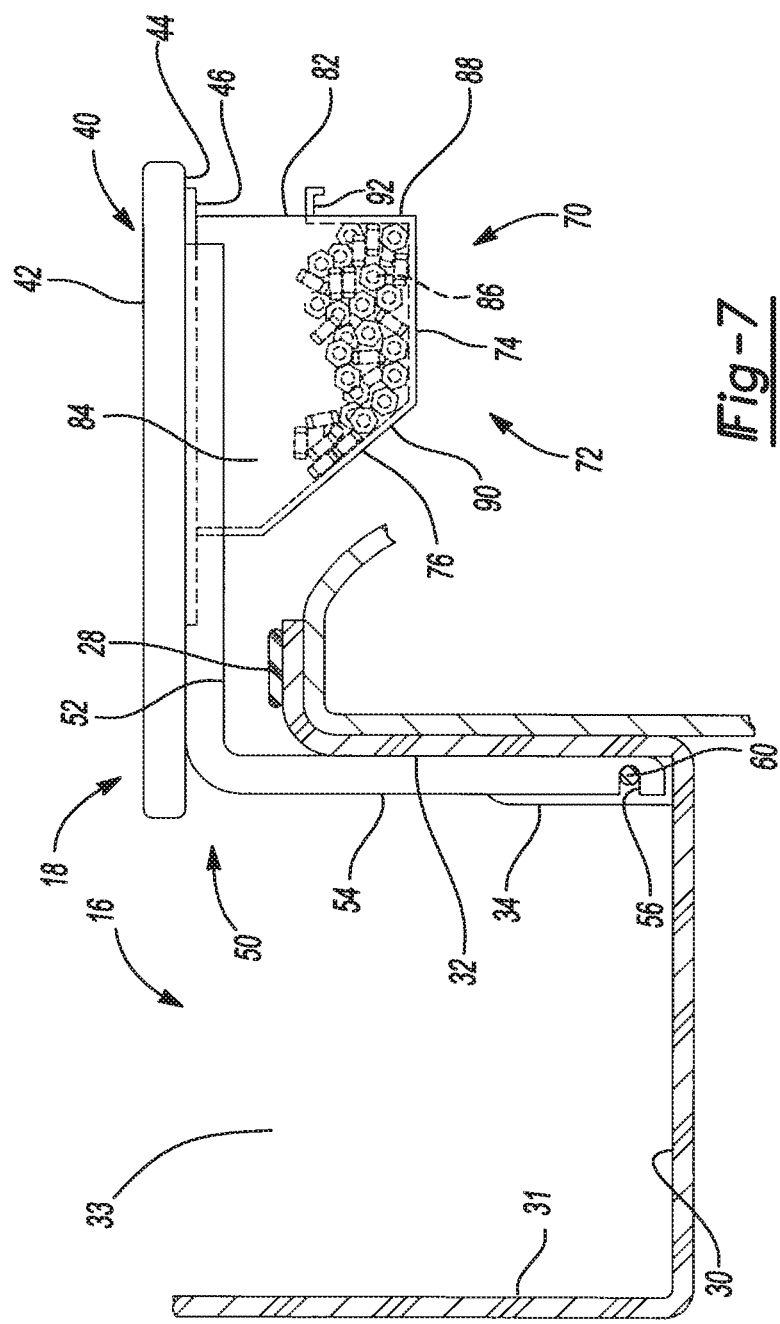
FIG. 7 is a cross-sectional view of the work surface assembly in the deployed position.

As shown in FIGS. 3 and 6, the plurality of arms 50 includes a table-supporting portion 52 and a hinge portion 54 that are perpendicular to each other and cooperate to form an L shape. The table-supporting portion 52 is attached to and extends parallel to the bottom side 44 of the worktable 40. The table-supporting portion 52 is also extends outside the storage compartment 16 and away from the cargo bed 14 when the work surface assembly 18 is in the deployed position. The hinge portion 54 is partly received in the channel 38 of each rib 34 when the work surface assembly 18 is in the stowed and deployed positions. As shown in FIGS. 3 and 7, an end of each of the hinge portions 54 of the plurality of arms 50 includes a U-shaped slot 56 extending therethrough. The U-shaped slot 56 receives the pivot pins 60, thereby pivotally attaching the work surface assembly 18 to the storage compartment 16 at the outer wall 32. The U-shaped slot 56 is vertically oriented when the work surface assembly 18 is in the stowed position (FIG. 3) and horizontally oriented when the work surface assembly 18 is in the deployed position (FIG. 7).

Figure 8:
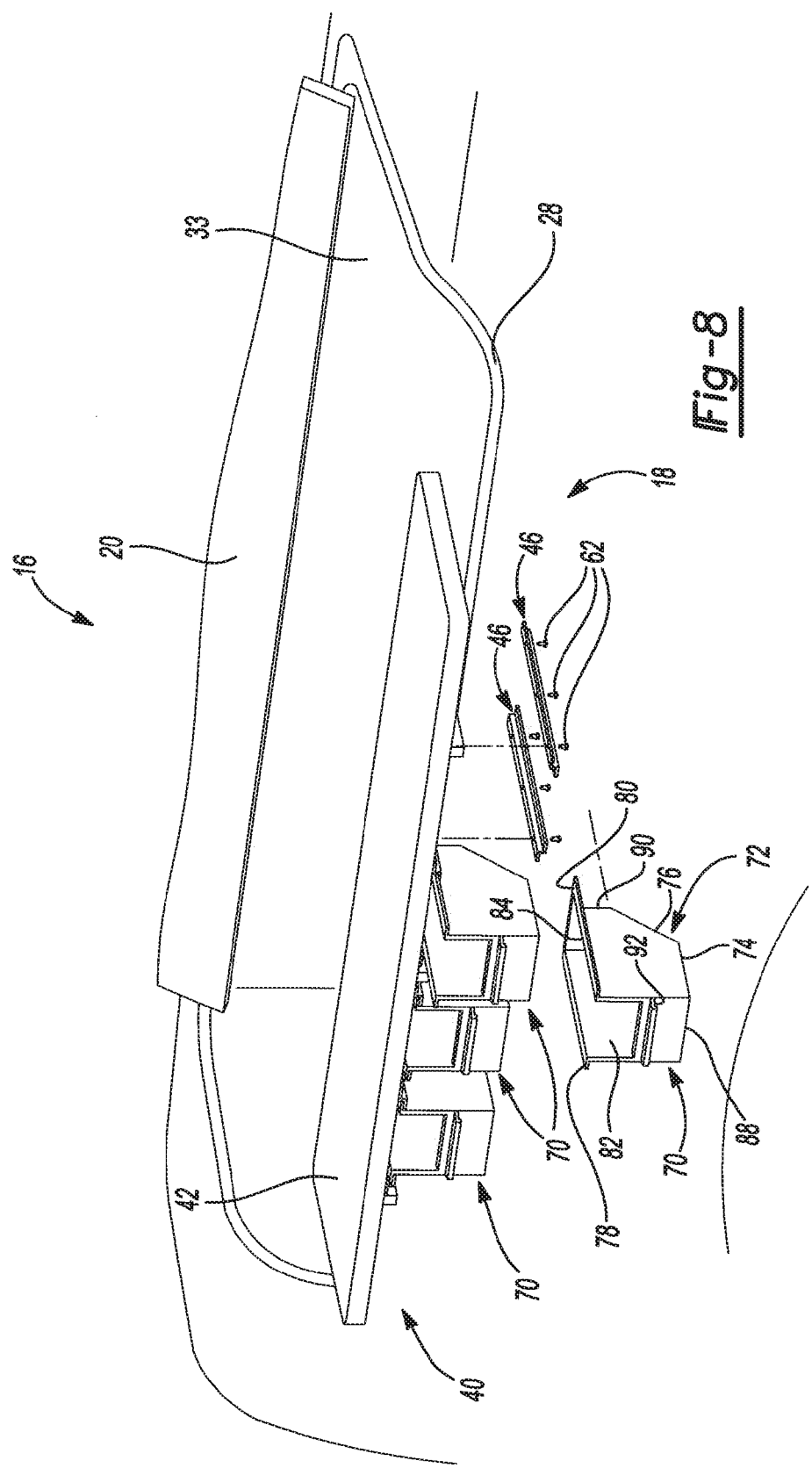
FIG. 8 is a partially exploded perspective view of the work surface assembly in the deployed position.

In an example, the plurality of storage containers 70 are made of a plastic material and wholly contained within the storage compartment 16 when the work surface assembly 18 is in the stowed position (FIG. 3). As shown in FIG. 3, the plurality of storage containers 70 are positioned between the worktable 40 and the outer wall 32 of the storage compartment 16 when the work surface assembly 18 is in the stowed position. As shown in FIG. 8, the plurality of storage containers 70 are outside of the storage compartment 16 when the work surface assembly 18 is in the deployed position. As shown in FIG. 8, the plurality of storage containers 70 are slidable relative to the worktable 40 between a pushed-in position and a pulled-out position.

As shown in FIG. 8, each storage container 70 includes a body 72 having a bottom 74, an incline side 76, and a pair of flanges, 78, 80. An opening 82 of the body 72 also provides access to a cavity 84 in which objects 86 (e.g., nuts, bolts, washers, and/or other hardware), are storable by a user. The objects 86 are supported at the incline side 76 of each storage container 70 when the work surface assembly 18 is in the stowed position (FIG. 3) and at the bottom 74 thereof when the work surface assembly 18 is in the deployed position (FIG. 7). The bottom 74 is situated at a front end 88 of each storage container 70 and the incline side 76 is situated at a back end 90. The bottom 74 and the incline side 76 of each storage container 70 are attached to each other forming an obtuse angle. As shown in FIG. 5, the pair of flanges 78, 80 extend outwardly from the body 72 in opposite directions of each other. The pair of flanges 78, 80 also extend in a direction parallel to the bottom 74 of each storage container 70. The pair of flanges 78, 80 are inserted into the slots 48 formed between the rails 46 and the bottom side 44 of the worktable 40 such that each storage container 70 slidably engages the rails 46 and worktable 40. The front end 88 of the body 72 includes a tab 92 that the user grips to slide the storage container 70 along the rails 46 between the pulled-out and pushed-in positions.

With continued reference to FIGS. 1-10, operation of the work surface assembly 18 will be described in detail. During normal operation of the vehicle 10 (e.g., driving), the lid 20 of the storage compartment 16 is closed so that the work surface assembly 18 is securely retained in the stowed position. When the vehicle 10 is parked, the user is able to move the work surface assembly 18 into the deployed position by opening the lid 20, gripping the worktable 40 and pulling the worktable 40 out of the storage compartment 16 (i.e., by rotating the arms 50 ninety degrees). This positions the worktable 40 outside of the storage compartment 16 (FIGS. 6 and 8) and allows the user to use the worktable 40 as a work surface or a surface upon which to set objects (e.g., at a jobsite, a tailgate party, etc.).

When the work surface assembly 18 is in the deployed position, the hinge portion 54 U-shaped slots 56 are in the horizontally oriented position (i.e., the open ends of the slots are facing the inner wall 31, as shown in FIG. 7), thereby preventing the work surface assembly 18 from being detached from the storage compartment 16. After the user is done using the worktable 40, the user rotates the worktable 40 ninety degrees (i.e., in the opposite direction of withdrawal) to place the work surface assembly 18 back in the stowed position. While in the stowed position, the U-shaped slots 56 are in the vertically oriented position (i.e., the open ends of the slots are facing the bottom surface 30, as shown in FIG. 9), which allows for the user to detach the work surface assembly 18 from the storage compartment 16 by vertically lifting the worktable 40 out of the storage compartment 16 (FIGS. 9 and 10). This is done to provide service to the work surface assembly 18 or allow for more storage space of the storage compartment 16, for example.

In addition to using the worktable 40 of the work surface assembly 18, the user is also able to access and use the objects 86 in each storage container 70 of the work surface assembly 18. When the work surface assembly 18 is in the stowed position, the objects 86 are contained in each storage container 70 at the incline side 76 situated at the back end 90 (FIG. 3) thereof. After the worktable 40 has been rotated to the deployed position, the objects 86 move toward the front end 88 of the storage containers 70 (FIG. 7).

The user grips the tab 92 and pulls the storage containers 70 along the rails 46 to the pulled-out position to access the objects 86 within the storage containers 70. The user pushes the storage containers 70 along the rails 46 to the pushed-in position to stow the storage containers 70.

What is claimed is:

1. A vehicle comprising:
a cab;
a cargo bed attached at a rear of the cab and including a plurality of walls defining a periphery of the cargo bed, at least one of the plurality of walls including a storage compartment formed therein; and
a work surface assembly including a worktable and a plurality of arms attached to the worktable and pivotally attached to a wall of the storage compartment at a location inside of the storage compartment,
wherein the work surface assembly is pivotal between a stowed position in which the work surface assembly is wholly contained within the storage compartment and a deployed position in which the worktable and a portion of each of the arms extend out of the storage compartment.

2. The vehicle of claim 1, wherein the wall of the storage compartment includes a plurality of channels and pivot pins extending through the plurality of channels.

3. The vehicle of claim 2, wherein the arms are pivotally attached to the pivot pins.

4. The vehicle of claim 3, wherein portions of the arms that are attached to the worktable are parallel to the wall of the storage compartment when the work surface assembly is in the stowed position.

5. The vehicle of claim 4, wherein the portions of the arms that are attached to the worktable are positioned above and perpendicular to the wall of the storage compartment when the work surface assembly is in the deployed position.

6. The vehicle of claim 5, wherein portions of the arms are partially received in the plurality of channels of the wall when the work surface assembly is in the stowed and deployed positions.

7. The vehicle of claim 3, wherein U-shaped slots extending through the plurality of arms receive the pivot pins extending through the plurality of channels to pivotally attach the plurality of arms to the wall of the storage compartment.

8. The vehicle of claim 7, wherein openings of the U-shaped slots face a bottom surface of the storage compartment when the work surface assembly is in the stowed position.

9. The vehicle of claim 8, wherein the work surface assembly is removable from the pivot pins when the openings of the U-shaped slots face the bottom surface of the storage compartment.

10. The vehicle of claim 9, wherein openings of the U-shaped slots face opposite the wall of the storage compartment when the work surface assembly is in the deployed position.

11. The vehicle of claim 1, wherein the work surface assembly is rotated 90 degrees from the stowed position to the deployed position.

12. The vehicle of claim 1, further comprising a plurality of storage containers slidably engaging the worktable of the work surface assembly.

13. The vehicle of claim 12, wherein a back end of each storage container includes an inclined surface that is disposed at an obtuse angle relative to a bottom surface of the storage container.

14. The vehicle of claim 1, wherein at least a portion of the worktable extends laterally outward beyond a laterally outermost surface of the cargo bed.

15. The vehicle of claim 1, further comprising a lid that seals an opening of the storage compartment and contains the work surface assembly within the storage compartment when the work surface assembly is in the stowed position.

* * * * *